(12) United States Patent
Koning et al.

(10) Patent No.: US 8,966,197 B2
(45) Date of Patent: *Feb. 24, 2015

(54) DISTRIBUTED SNAPSHOT PROCESS

(75) Inventors: G. Paul Koning, Nashua, NH (US); Peter C. Hayden, Mount Vernon, NH (US); Paula Long, Hollis, NH (US); Hsin H. Lee, Marlborough, MA (US); Vasudevan Subramanian, Nashua, NH (US); Lazarus J. Vekiarides, West Roxbury, MA (US); Satyanarayana R. Goluguri, Nashua, NH (US)

(73) Assignee: Dell Products L.P., Round Rock, TX (US)

( * ) Notice: Subject to any disclaimer, the term of this patent is extended or adjusted under 35 U.S.C. 154(b) by 771 days.

This patent is subject to a terminal disclaimer.

(21) Appl. No.: 13/238,586

(22) Filed: Sep. 21, 2011

(65) Prior Publication Data

US 2012/0030174 A1    Feb. 2, 2012

Related U.S. Application Data

(63) Continuation of application No. 11/585,363, filed on Oct. 23, 2006, now Pat. No. 8,037,264, which is a continuation-in-part of application No. 10/761,893, filed on Jan. 20, 2004, now Pat. No. 7,127,577.

(60) Provisional application No. 60/441,810, filed on Jan. 21, 2003.

(51) Int. Cl.
*G06F 12/00* (2006.01)
*G06F 17/30* (2006.01)
*G06F 11/14* (2006.01)

(52) U.S. Cl.
CPC ...... *G06F 17/30067* (2013.01); *G06F 11/1464* (2013.01); *G06F 2201/84* (2013.01)
USPC .......................................... 711/161; 711/162

(58) Field of Classification Search
None
See application file for complete search history.

(56) References Cited

U.S. PATENT DOCUMENTS

| 5,392,244 | A | 2/1995 | Jacobson et al. |
| 5,678,042 | A | 10/1997 | Pisello et al. |
| 5,774,660 | A | 6/1998 | Brendel et al. |

(Continued)

FOREIGN PATENT DOCUMENTS

| WO | WO 99/53415 A1 | 10/1999 |
| WO | WO 01/38983 A2 | 5/2001 |

(Continued)

OTHER PUBLICATIONS

"Enlist Desktops to Mirror Data," TechTarget (2002).

(Continued)

*Primary Examiner* — Midys Rojas
(74) *Attorney, Agent, or Firm* — Hamilton, Brook, Smith & Reynolds, P.C.

(57) ABSTRACT

Systems and methods for providing an efficient partitioned resource server are disclosed. The partitioned resource server includes a plurality of individual servers, and the individual servers support a storage service. The systems and methods provide archiving processes for partitioned resources. To this end, the systems and process include a snapshot process operating on a server and capable of coordinating with other snapshot processes operating on the other servers for generating state information representative of the state of the partitioned resources.

15 Claims, 8 Drawing Sheets

(56) References Cited

U.S. PATENT DOCUMENTS

| | | |
|---|---|---|
| 5,774,668 A | 6/1998 | Choquier et al. |
| 5,978,844 A | 11/1999 | Tsuchiya et al. |
| 6,070,191 A | 5/2000 | Narendran et al. |
| 6,108,727 A | 8/2000 | Boals et al. |
| 6,122,681 A | 9/2000 | Aditya et al. |
| 6,128,279 A | 10/2000 | O'Neil et al. |
| 6,141,688 A | 10/2000 | Bi et al. |
| 6,144,848 A | 11/2000 | Walsh et al. |
| 6,148,414 A | 11/2000 | Brown et al. |
| 6,189,079 B1 | 2/2001 | Micka et al. |
| 6,195,682 B1 | 2/2001 | Ho et al. |
| 6,199,112 B1 | 3/2001 | Wilson |
| 6,212,565 B1 | 4/2001 | Gupta |
| 6,212,606 B1 | 4/2001 | Dimitroff |
| 6,226,684 B1 | 5/2001 | Sung et al. |
| 6,292,181 B1 | 9/2001 | Banerjee et al. |
| 6,341,311 B1 | 1/2002 | Smith et al. |
| 6,360,262 B1 | 3/2002 | Guenthner et al. |
| 6,421,723 B1 | 7/2002 | Tawil |
| 6,434,683 B1 | 8/2002 | West et al. |
| 6,449,688 B1 | 9/2002 | Peters et al. |
| 6,460,083 B1 | 10/2002 | Niwa et al. |
| 6,473,791 B1 | 10/2002 | Al-Ghosein et al. |
| 6,498,791 B2 | 12/2002 | Pickett et al. |
| 6,598,134 B2 | 7/2003 | Ofek et al. |
| 6,647,473 B1 | 11/2003 | Golds et al. |
| 6,687,731 B1 | 2/2004 | Kavak |
| 6,718,436 B2 | 4/2004 | Kim et al. |
| 6,725,253 B1 | 4/2004 | Okano et al. |
| 6,728,747 B1 | 4/2004 | Jenkins et al. |
| 6,732,171 B2 | 5/2004 | Hayden |
| 6,742,059 B1 | 5/2004 | Todd et al. |
| 6,766,348 B1 | 7/2004 | Combs et al. |
| 6,813,635 B1 | 11/2004 | Jorgenson |
| 6,850,982 B1 | 2/2005 | Siegel |
| 6,859,834 B1 | 2/2005 | Arora et al. |
| 6,886,035 B2 | 4/2005 | Wolff |
| 6,889,249 B2 | 5/2005 | Miloushev et al. |
| 6,910,150 B2 | 6/2005 | Mashayekhi et al. |
| 6,944,777 B1 | 9/2005 | Belani et al. |
| 6,950,848 B1 | 9/2005 | Yousefi'zadeh |
| 6,957,433 B2 | 10/2005 | Umberger et al. |
| 6,985,956 B2 | 1/2006 | Luke et al. |
| 7,043,564 B1 | 5/2006 | Cook et al. |
| 7,076,655 B2 | 7/2006 | Griffin et al. |
| 7,085,829 B2 | 8/2006 | Wu et al. |
| 7,089,293 B2 | 8/2006 | Grosner et al. |
| 7,127,577 B2 | 10/2006 | Koning et al. |
| 7,574,527 B1 | 8/2009 | Tormasov et al. |
| 7,685,126 B2 | 3/2010 | Patel et al. |
| 8,037,264 B2 | 10/2011 | Koning et al. |
| 8,055,706 B2 | 11/2011 | Koning et al. |
| 8,209,515 B2 | 6/2012 | Schott |
| 8,499,086 B2 | 7/2013 | Koning et al. |
| 2001/0039581 A1 | 11/2001 | Deng et al. |
| 2002/0008693 A1 | 1/2002 | Banerjee et al. |
| 2002/0009079 A1 | 1/2002 | Jungck et al. |
| 2002/0035667 A1 | 3/2002 | Brunning et al. |
| 2002/0059451 A1 | 5/2002 | Haviv et al. |
| 2002/0065799 A1 | 5/2002 | West et al. |
| 2002/0083366 A1 | 6/2002 | Ohran |
| 2002/0129214 A1 | 9/2002 | Sarkar |
| 2002/0138551 A1 | 9/2002 | Erickson |
| 2002/0194324 A1 | 12/2002 | Guha |
| 2003/0005119 A1 | 1/2003 | Mercier et al. |
| 2003/0074596 A1 | 4/2003 | Mashayekhi et al. |
| 2003/0117954 A1 | 6/2003 | De Neve et al. |
| 2003/0154236 A1 | 8/2003 | Dar et al. |
| 2003/0212752 A1 | 11/2003 | Thunquest et al. |
| 2003/0225884 A1 | 12/2003 | Hayden |
| 2004/0030755 A1 | 2/2004 | Koning et al. |
| 2004/0049564 A1 | 3/2004 | Ng et al. |
| 2004/0080558 A1 | 4/2004 | Blumenau et al. |
| 2004/0083345 A1 | 4/2004 | Kim et al. |
| 2004/0090966 A1 | 5/2004 | Thomas |
| 2004/0103104 A1 | 5/2004 | Hara et al. |
| 2004/0128442 A1 | 7/2004 | Hinshaw et al. |
| 2004/0143648 A1 | 7/2004 | Koning et al. |
| 2004/0153479 A1 | 8/2004 | Mikesell et al. |
| 2004/0153606 A1 | 8/2004 | Schott |
| 2004/0153615 A1 | 8/2004 | Koning et al. |
| 2005/0010618 A1 | 1/2005 | Hayden |
| 2005/0144199 A2 | 6/2005 | Hayden |
| 2006/0080370 A1 | 4/2006 | Torii et al. |
| 2007/0106857 A1 | 5/2007 | Koning et al. |
| 2008/0021907 A1 | 1/2008 | Patel et al. |
| 2008/0243773 A1 | 10/2008 | Patel et al. |
| 2009/0271589 A1 | 10/2009 | Karpoff et al. |
| 2010/0235413 A1 | 9/2010 | Patel et al. |
| 2010/0257219 A1 | 10/2010 | Patel et al. |
| 2013/0254400 A1 | 9/2013 | Koning et al. |

FOREIGN PATENT DOCUMENTS

| | | |
|---|---|---|
| WO | WO 02/37943 A2 | 5/2002 |
| WO | WO 02/44885 A2 | 6/2002 |
| WO | WO 02/056182 A2 | 7/2002 |
| WO | WO 2004/066278 A2 | 8/2004 |

OTHER PUBLICATIONS

Anderson, T.E. et al.,"Serverless Network File Systems," ACM Transactions on Computer Systems, Assoc. for Computing Machinery, New York, US, vol. 14, No. 1, pp. 41-79, Feb. 1, 1996.

Baltazar, H. and Garcia, A., Build Your Own SAN (2002).

Druschel, P., Rice University and Rowstron, A., Microsoft Research, Cambridge, UK, PAST: A Large-Scale, Persistent Peer-to-Peer Storage Utility.

Hac A. et al.: *IEEE*: "Dynamic Load Balancing in a Distributed System Using a Decenralized Algorithm," Int. Conf. on Distributed Computing Systems, West Berlin, Sep. 21, 1987. Conf. Proceedings, vol. 7, pp. 170-177, Sep. 21, 1987.

Hartman, J.H. et al., "The Zebra Striped Network File System," Operating Review (SIGOPS), ACM Headquarter New York, US, vol. 27, No. 5, Dec. 1, 1993, pp. 29-43.

Networking with Pyramix.

Ottem, E., "Getting the Most From your Storage: How to Deploy a SAN," Gadzoox Networks, Inc. (1999).

Rapaport, L. and Baltazar, H., Introduction to SANs: Technology, Benefits, and Applications, (Jul. 9, 2001).

Scheuermann, P. et al., "Data Partitioning and Load Balancing in Parallel Disk Systems," Techn. Rpt. A/02/96 University of Saarland, pp. 1-48.

Storage Area Networking (SAN)—The Veritas Strategy, Q Associates (2000).

Wei Lui et al., "Design of an I/O Balancing File System on Web Server Clusters," Parallel Processing 2000 Intern, Workshops on Aug. 21-24, 200, Piscataway, NJ, USA, IEEE, Aug. 21, 2000, pp. 119-125.

* U.S. Appl. No. 60/411,743 to Hinshaw et al., filed, Sep. 18, 2002.

Office Action, U.S. Appl. No. 10/762,985, dated Sep. 20, 2012.*

Resource 17

| Page | Server ID |
|---|---|
| 0 | 2 |
| 1 | 3 |
| 2 | 3 |
| 3 | 2 |
| ... | ... |
| 9197 | 3 |
| ... | ... |

| Server ID | Server |
|---|---|
| 2 | 162 |
| 3 | 163 |

Resource 18

| Page | Server ID |
|---|---|
| 0 | 1 |
| 1 | 2 |
| 2 | 2 |
| 3 | 1 |
| ... | ... |
| 7942 | 1 |
| ... | ... |

| Server ID | Server |
|---|---|
| 1 | 161 |
| 2 | 162 |

Fig. 6

DISTRIBUTED SNAPSHOT PROCESS

RELATED APPLICATION(S)

This application is a continuation of U.S. application Ser. No. 11/585,363, filed Oct. 23, 2006, now U.S. Pat. No. 8,037, 264, which is a continuation-in-part of U.S. application Ser. No. 10/761,893, filed Jan. 20, 2004, now U.S. Pat. No. 7,127, 577, which claims the benefit of U.S. Provisional Application No. 60/441,810 filed Jan. 21, 2003.

The entire teachings of the above application(s) are incorporated herein by reference.

FIELD OF INVENTION

The invention relates to data storage an in particular to systems and methods for backing up data blocks across a plurality of servers.

BACKGROUND OF THE INVENTION

It is desirable during the operation of a mass storage system to periodically gather information about how the data is stored on the system and from time-to-time to make a backup copy of the stored data. Gathering such information can be beneficial for a number of reasons, including for recovery in the event of a non-recoverable failure.

Backing up a mass storage system is typically done by reading the data stored on the mass storage system and writing it to a backup storage system, such as a disk storage system or a magnetic tape, to create an archive copy of the stored data.

However, generating such archival copies can be burdensome. Many prior art backup methods require that the system be removed from ongoing (online) operations to assure the integrity and consistency of the backup copy. This is because normal backup techniques either copy the blocks from the mass storage system sequentially to a backup system, or walk through the file system on the mass storage system, starting with the first block of the first file in the first directory and proceeding in order to the last block of the last file of the last directory. In either case, the backup process is unaware of updates being performed as data is being written to backup system.

Thus, to permit continued, online operations while performing backup operations generates inconsistencies if the data is modified as the backup operation proceeds. Removing the storage system from continued storage operations eliminates the risk of inconsistencies arising during the system operations. However, backup operations can be time consuming therefore making removal of the system from operations undesirable.

One approach to addressing this problem, has been by creating a mirror, or identical copy, of one disk's data. When a backup operation is required, the mirror disk may be used as a static image for a storage. When the static image is no longer necessary (for example, when a tape backup has been completed), the two disks are resynchronized, by copying any changes made during the time mirroring was not active to the mirror disk, and mirroring is resumed.

Although, mirroring works well, it requires that the data stored on the system be captured accurately. Today however, new distributed storage systems are being developed that avoid the use of a centralized storage control system. These distributed systems capture the benefits of the more flexible and scalable distributed server architectures. Although very exciting, these storage systems present challenges that prior art storage systems do not. One such challenge is the ability to generate reliable and trustworthy archive copies of a resource, also referred to as data volume or storage volume, that has been distributed across a plurality of independently operating servers.

Accordingly, there is a need in the art for a distributed storage system that can provide reliable snapshots of the resources that are being maintained across the different server in the system.

SUMMARY OF THE INVENTION

The systems and methods described herein, include server systems that comprise a group of servers that support a service or a resource that has been partitioned across the individual servers of the group. In one application, the systems and methods provide a partitioned storage service for providing storage services to a plurality of clients. In this embodiment, one or more resources may be partitioned across a plurality of servers, with each server being responsible for a portion of the resources. In the partitioned service, the resources have been spread over several servers, with each server owning a portion of the data within the volume.

For the purpose of fault tolerance, data back-up, and other benefits, the partitioned storage services described herein provide a storage administrator with a snapshot process and system that creates a copy of the state of the resources. Typically, the snapshot process results in the creation of a second storage volume, which acts as an archive of the state of the storage system at a given time. Storage administrators may employ this archive as a recovery tool in the case that the original resources fails at a later time, a backup tool for off-line backups, or for any other suitable reason.

Further features and advantages of the invention will be apparent from the following description of preferred embodiments and from the claims.

BRIEF DESCRIPTION OF THE DRAWINGS

Further features and advantages of the invention will be apparent from the following description of preferred embodiments and from the claims.

FIG. 6 depicts an example of a routing table suitable for use with the system of FIG. 5;

DETAILED DESCRIPTION OF THE INVENTION

The systems and methods described herein include systems for organizing and managing resources that have been distributed over a plurality of servers on a data network. More particularly, the systems and methods described herein include systems and methods for providing archiving processes for a partitioned storage service.

However, it will be understood by those of skill in the art that the invention may be employed with applications and services other than storage applications including although are not limited to, distributed file systems, and database systems. Moreover, it will be understood by those of ordinary skill in the art that the systems and methods described herein are merely exemplary of the kinds of systems and methods that may be achieved through the invention and that these exemplary embodiments may be modified, supplemented and amended as appropriate for the application at hand.

Figure 1:
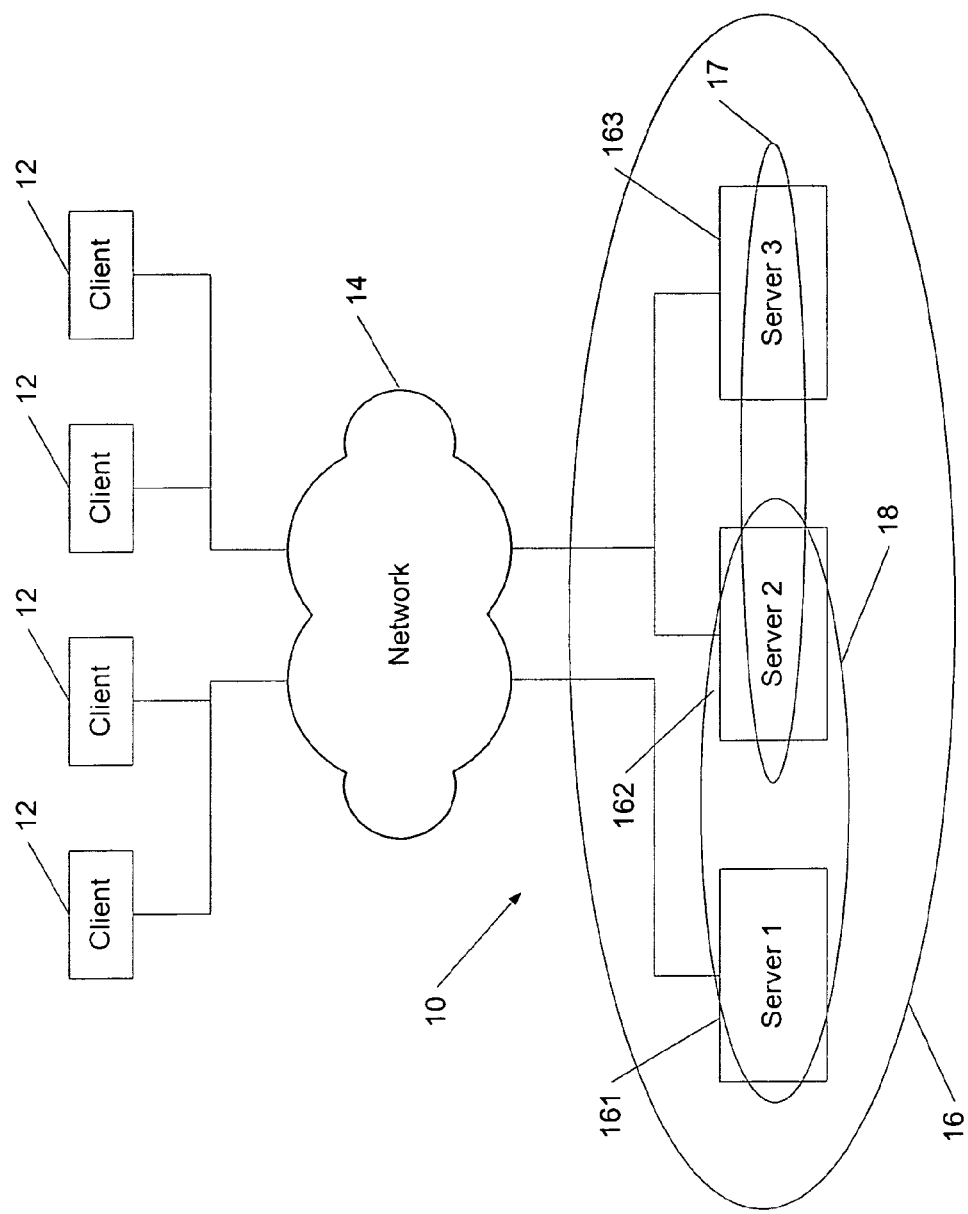
FIG. 1 is a schematic diagram of a client-server architecture with servers organized in a server group.

Referring first to FIG. 1 one embodiment of a system according to the invention is depicted. As show in FIG. 1, one or several clients 12 are connected, for example via a network 14, such as the Internet, an intranet, a WAN or LAN, or by direct connection, to servers 161, 162, and 163 that are part of a server group 16.

The depicted clients 12 can be any suitable computer system such as a PC workstation, a handheld computing device, a wireless communication device, or any other such device, equipped with a network client program capable of accessing and interacting with the server group 16 to exchange information with the server group 16. Optionally, the client 12 and the server group 16 rely on an unsecured communication path for accessing services at the remote server group 16. To add security to such a communication path, the client 12 and the server group 16 may employ a security system, such as any of the conventional security systems that have been developed to provide a secure channel for transmitting data over a network. One such system is the Netscape secured socket layer (SSL) security mechanism that provides a trusted path between a client and a server.

FIG. 1 further depicts that the client 12 may communicate with a plurality of servers, 161, 162 and 163. The servers 161, 162 and 163 employed by the system 10 may be conventional, commercially available server hardware platforms, such as a SunSparc™ systems running a version of the Unix operating system. However any suitable data processing platform may be employed. Moreover, it will be understood that one or more of the servers 161, 162 or 163 may comprise a storage device, such as a tape library, or other device, that is networked with the other servers and clients through network 14.

Each server 161, 162 and 163 may include software components for carrying out the operation and the transactions described herein, and the software architecture of the servers 161, 162 and 163 may vary according to the application. In certain embodiments, the servers 161, 162 and 163 may employ a software architecture that builds certain of the processes described below into the server's operating system, into device drivers, into application level programs, or into a software process that operates on a peripheral device, such as a tape library, a RAID storage system or some other device. In any case, it will be understood by those of ordinary skill in the art, that the systems and methods described herein may be realized through many different embodiments, and practices, and that the particular embodiment and practice employed will vary as a function of the application of interest and all these embodiments and practices fall within the scope hereof.

In operation, the clients 12 will have need of the resources partitioned across the server group 16. Accordingly, each of the clients 12 will send requests to the server 20 group 16. In a typical operation, a client 12 will contact one of the servers, for example server 161, in the group 16 to access a resource, such as a data block, page, file, database table, application, or other resource. The contacted server 161 itself may not hold or have control over the requested resource. However, in a preferred embodiment, the server group 16 is configured to make all the partitioned resources available to the client 12 regardless of the server that initially receives the request. For illustration, the diagram shows two resources, one resource 18 ("Resource 2") that is partitioned over the two servers 161 and 162, and another resource 17 ("Resource 1") that is partitioned over the two servers 162 and 163. In the exemplary application of the system 10 being a block data storage system, each resource 18 and 17 may represent a partitioned block resource.

The depicted server group 16 therefore provides a block data storage service that may operate as a storage area network (SAN) comprised of a plurality of servers, servers 161, 162 and 163. Each of the servers 161, 162 and 163 may support one or more portions of the partitioned block resources 18 and 17. In the depicted system 10, there are two resources and three servers, however there is no specific limit on the number of servers. Similarly, there is no specific limit on the number of resources or resources.

Moreover, each resource or several resources may be contained entirely on a single server, or may be partitioned over several servers, either all of the servers in the server group, or a subset of the servers in the server group. In practice, there may of course be limits due to implementation considerations, for example the amount of memory available in the servers 161, 162 and 163 or the computational limitations of the servers 161, 162 and 163. The grouping itself, i.e., deciding which servers will comprise a group, may in one practice involve an administrative decision. In a typical scenario, a group might at first contain only a few servers, or perhaps only one. The system administrator would add servers to a group as needed to obtain the level of performance required. Increasing servers creates more space (memory, disk storage) for resources that are stored, more CPU processing capacity to act on the client requests, and more network capacity (network interfaces) to carry the requests and responses from and to the clients. It will be appreciated by those of skill in the art that the systems described herein are readily scaled to address increased client demands by adding additional servers into the group 16.

Figure 2:
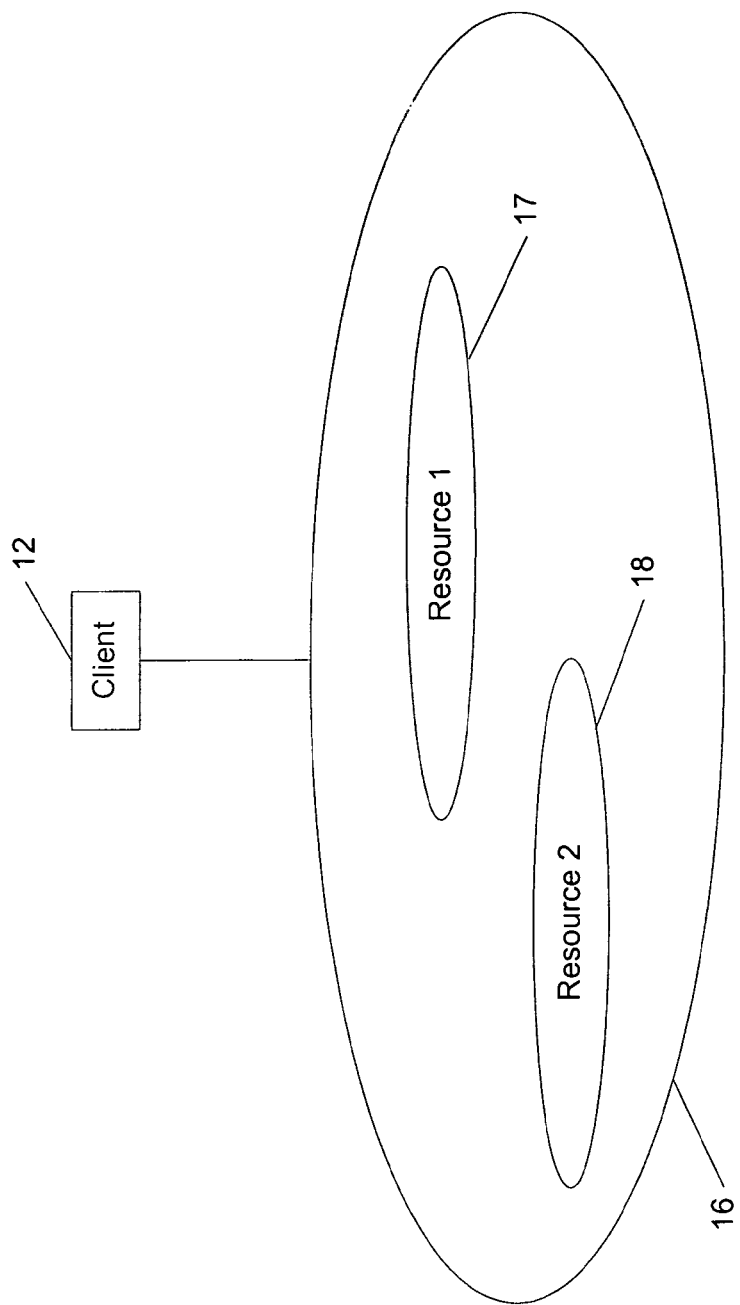
FIG. 2 is a schematic diagram of the server group of FIG. 1 as seen by a client.

Referring now to FIG. 2, a client 12 connecting to a server 161 (FIG. 1) will see the server group 16 as if the group were a single server having multiple IP addresses. The client 12 is not aware that the server group 16 is constructed of a potentially large number of servers 161, 162, 163, nor is it aware of the partitioning of the block resources 17, 18 over the several servers 161, 162, 163. As a result, the number of servers and the manner in which resources are partitioned among the servers may be changed without affecting the network environment seen by the client 12.

Figure 3:
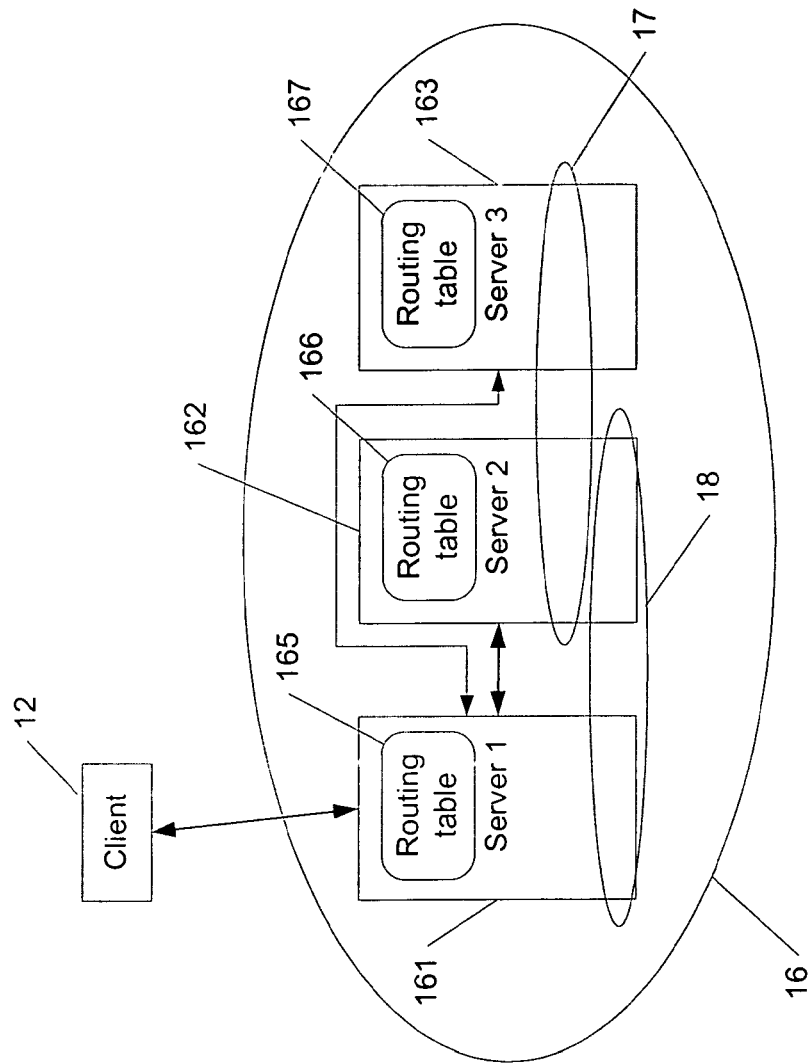
FIG. 3 shows details of the information flow between the client and the servers of the server group of FIG. 1.

FIG. 3 shows the resource 18 of FIG. 2 as being partitioned across servers 161 and 162. In the partitioned server group 16, any resource may be spread over any number of servers within the group 16. As already discussed above with reference to FIGS. 1 and 2, one resource or volume 17 ("Resource 1") may be spread over servers 162, 163, whereas another resource or volume 18 ("Resource 2") may be spread over servers 161 and 162. Advantageously, the respective volumes may be arranged in fixed-size groups of blocks, also referred to as "pages", wherein an exemplary page contains 8192 blocks.

Other suitable page sizes may be employed. In an exemplary embodiment, each server 161, 162, 163 in the group 16 contains a respective routing table 165, 166, 167 for each volume, with the routing table 165 identifying the server on which a specific page of a specific volume can be found. For example, when the server 161 receives a request from a client 12 for volume 18, block 93847, the server 161 calculates the page number (page 11 in this example for a page size of 8192) and looks up in the corresponding routing table 165 the location or number of the server that contains page 11 of volume 18. If server 162 rather than server 161 contains the requested page 11, then the request is forwarded to server 162, which reads the data and returns the data to the server 161.

Server 161 then send the requested data to the client 12. The response may be returned to the client 12 via the same server 161 that received the request from the client 12.

Accordingly, it is immaterial to the client 12 as to which server 161, 162, 163 has the resource of interest to the client 12. As described above, the servers 162, 162 and 163 will employ the respective routing tables 165, 166, 167 to service the client request, and the client 12 need not know ahead of time which server is associated with the requested resource. This allows portions of the resource to exist at different servers. It also allows resources, or portions thereof, to be moved while the client 12 is connected to the server group 16. Upon moving a resource, the routing tables 165, 166, 167 are updated as necessary and subsequent client requests will be forwarded to the server now responsible for handling that request. At least within a resource 17 or 18, the routing tables 165, 166, 167 may be identical for that resource.

Figure 4:
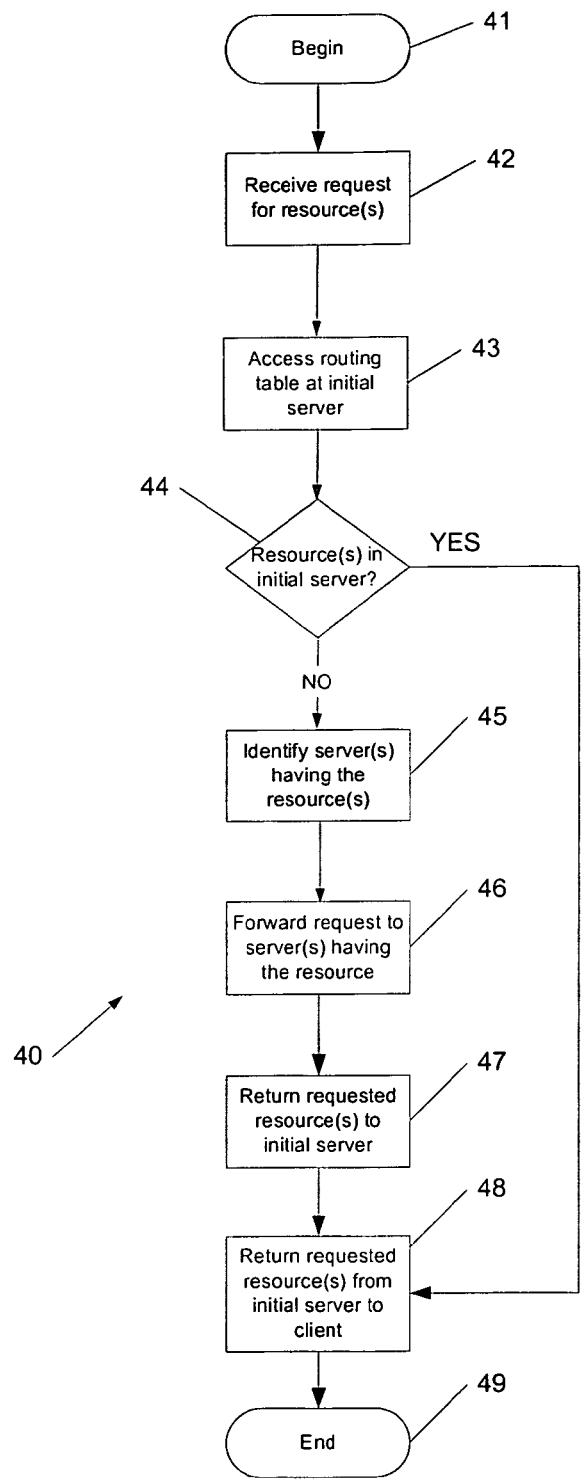
FIG. 4 is a process flow diagram for retrieving resources in a partitioned resource environment.

FIG. 4 depicts an exemplary request handling process 40 for handling client requests in a partitioned server environment. The request handling process 40 begins at 41 by receiving a request for a resource, such as a file or blocks of a file, at 42. The request handling process 40 examines the routing table, in operation 43, to determine at which server the requested resource is located. If the requested resource is present at the initial server, at 44, the initial server returns the requested resource to the client 12, at 48, and the process 40 terminates at 49. Conversely, if the requested resource is not present at the initial server, at 44, the server will use the data from the routing table at the initial server to determine which server actually holds the resource requested by the client, operation 45. The request is then forwarded to the server that holds the requested resource, operation 46, which returns the requested resource to the initial server, operation 48. The process 40 then goes to 48 as before, to have the initial server forward the requested resource to the client 12, and the process 40 terminates, at 49.

Accordingly, one of ordinary skill in the art will recognize that the system and methods described herein are capable of partitioning one or more resources over a plurality of servers in a server group and are capable of handling requests from multiple clients. Additionally, the above description illustrates that the systems and methods described herein can redistribute or repartition the resource to change how portions of the resource are distributed or spread across the server group. The resources spread over the several servers can be directories, individual files within a directory, blocks within a file or any combination thereof. Other partitioned services may be realized. For example, it may be possible to partition a database in an analogous fashion or to provide a distributed file system, or a distributed or partitioned server that supports applications being delivered over the internet. In general, the approach may be applied to any service where a client request can be interpreted as a request for a piece of the total resource.

Figure 5:
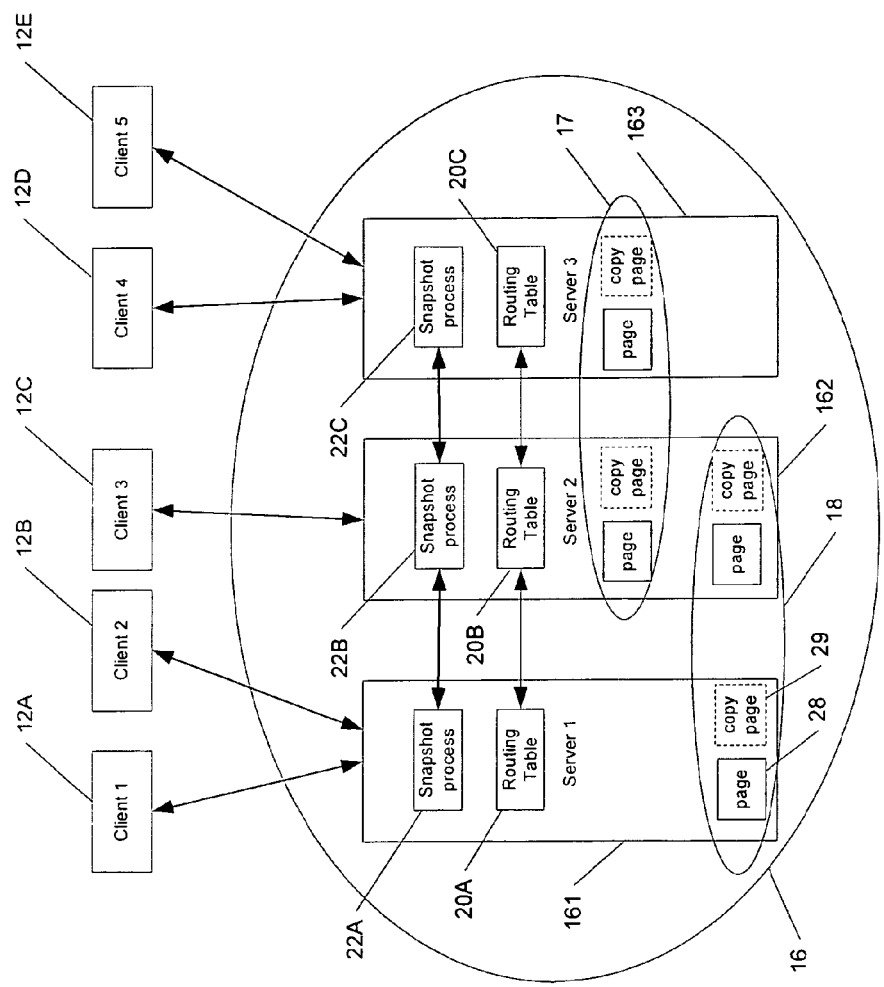
FIG. 5 depicts in more detail and as a functional block diagram one embodiment of a system according to the invention.

Turning now to FIG. 5, one particular embodiment of the system 10 is depicted wherein the system is capable of generating a distributed snapshot of one or more resources 17, 18 partitioned across the servers 161, 162 and 163. Specifically, FIG. 5 depicts the system 10 wherein the clients 12 communicate with the server group 16. The 15 server group 16 includes the three exemplary servers 161, 162 and 163 shown in FIGS. 1 and 3. In the embodiment of FIG. 5 the servers 161, 162 and 163 are shown as equivalent servers, in that each of the servers is capable of providing substantially the same resource to the same request received from a client. As such, from the perspective of the clients 12, the server group 16 appears to be a single server system that provides multiple network or IP addresses for communicating with clients 12. Each server includes a corresponding routing table, depicted as routing tables 20A, 20B and 20C, and a corresponding snapshot process 22A, 22B and 22C respectively. Further, and for the purpose of illustration only, FIG. 5 represents the resources 17, 18 as pages of data 28 that may be copied to generate second storage volumes representing an image of the original resources 17, 18.

In one embodiment, a single routing table can be implemented on a server for all partitioned resources that are stored on that particular server. This arrangement is depicted in FIGS. 3 and 5. Alternatively, each server may have a separate routing table for each partitioned resource on that server. The same applies to the snapshot processes executed on the servers, i.e. a common snapshot process can be provided for all partitioned resources on a server, or a separate snapshot process can be provided for each of the partitioned resources residing on a server.

As indicated in FIG. 5 by arrows, each of the routing tables 20A, 20B and 20C are capable of communicating with each other for the purpose of sharing information. As described above, the routing tables may track which of the individual equivalent servers is responsible for a particular resource maintained by the server group 16, even if no part of that resource is stored on that particular server. In the embodiment shown in FIG. 5, the server group 16 may form a SAN wherein each of the equivalent servers 161, 162 and 163 has an individual IP address that may be employed by a client 12 for accessing that particular equivalent server on the SAN. As further described above, each of the equivalent servers 161, 162 and 163 may be capable of providing the same response to the same request from a client 12. To that end, the routing tables 20A, 20B and 20C of the individual equivalent servers 161, 162 and 163 coordinate with each other to provide a global database of the different resources stored in the server group 16, and of the specific equivalent servers that are responsible for those resources.

FIG. 6 shows exemplary routing tables for the resources or volumes 17, 18, stored on the servers in the server group 16. The routing table includes an identifier (Server ID) for each of the equivalent servers 161, 162 and 163 that support the partitioned data block storage service within the server group 16. Each of the routing tables includes a table that identifies for each volume, 17, 18 those data pages associated with each of the respective equivalent servers 161, 162, 163 in server group 16. In the embodiment depicted by FIG. 6, the equivalent servers support two partitioned volumes 17, 18. A first volume 18 is distributed or partitioned across the two equivalent servers 161 and 162. The second volume 17 is partitioned across the two equivalent servers, servers 162 and 163.

Returning now to FIG. 5, it can be seen that each of the equivalent servers 161, 162 and 163 includes a snapshot process 22A, 22B and 22C, respectively. Each snapshot process may be a computer process operating on the server system and designed for generating a snapshot of those portions of the resources that are maintained by a respective server. Accordingly, the snapshot process 22A depicted in FIG. 5 may be responsible for generating a copy of that portion of the partitioned resource 18 that is maintained by server 161. This operation is depicted, at least in part, by FIG. 5 showing a page 28 and a copy 29 of the page 28. Likewise, snapshot process 22B may be responsible for generating a copy of that portion of partitioned resources 17 and 18 maintained by server 162.

In operation, each of the equivalent servers 161, 162 and 163 is generally capable of acting independently. Accordingly, the snapshot processes 22A, 22B and 22C must act in a coordinated manner to create accurate snapshots of the resource 17, 18 at a particular point in time. This need for coordination arises, at least in part, from the fact that write requests may be issued from the clients 12A through 12E at any time and to any of the servers 161, 162 and 163. Accordingly, write requests will be received by individual ones of the servers 161, 162 and 163 during the time that a snapshot process has begun. To prevent a snapshot process from generating unacceptable or unexpected results, the snapshot processes 22A, 22B and 22C coordinate their operation with each other for the purposes of generating state information that is representative of the state of the partitioned resources 17, 18 at a particular point in time. Specifically, in one practice, a time parameter is selected such that there is a time "T", shortly after a command to create a snapshot is issued, such that all write operations for which completion is indicated to the client 12 prior to "T" are included in the snapshot, and all write operations for which completion is indicated after "T" are excluded from the snapshot.

To this end, each snapshot process 22A, 22B and 22C is capable of receiving a request from an administrator to create a snapshot of the resources 17, 18. The snapshot process includes a coordinating process that will generate commands for coordinating the activities and operation of the snapshot processes operating on other servers that are supporting the resources of interest to the administrator. In the example depicted in FIG. 5, an administrator may issue a snapshot command to the snapshot process 22B operating on server 162. The snapshot command may request the snapshot process 22B to create a snapshot of resource 17 or resource 18 or any combination of resources in server group 16. The snapshot process 22B can access the routing table 20B to determine those servers in the server group 16 that are supporting at least a portion of the data blocks within resources 17, 18. The snapshot process 22B may then issue a command to each of the servers supporting a portion of the storage volumes 17, 18. In the example of FIG. 5, the servers 161 and 162 are supporting a portion of the resource 18. Accordingly, the snapshot process 22B may issue a command to the snapshot process 22A to prepare for creating a snapshot. At the same time, the snapshot process 22B can begin itself to prepare to create a snapshot of that portion of the resource 18 maintained on server 162.

Figure 7:
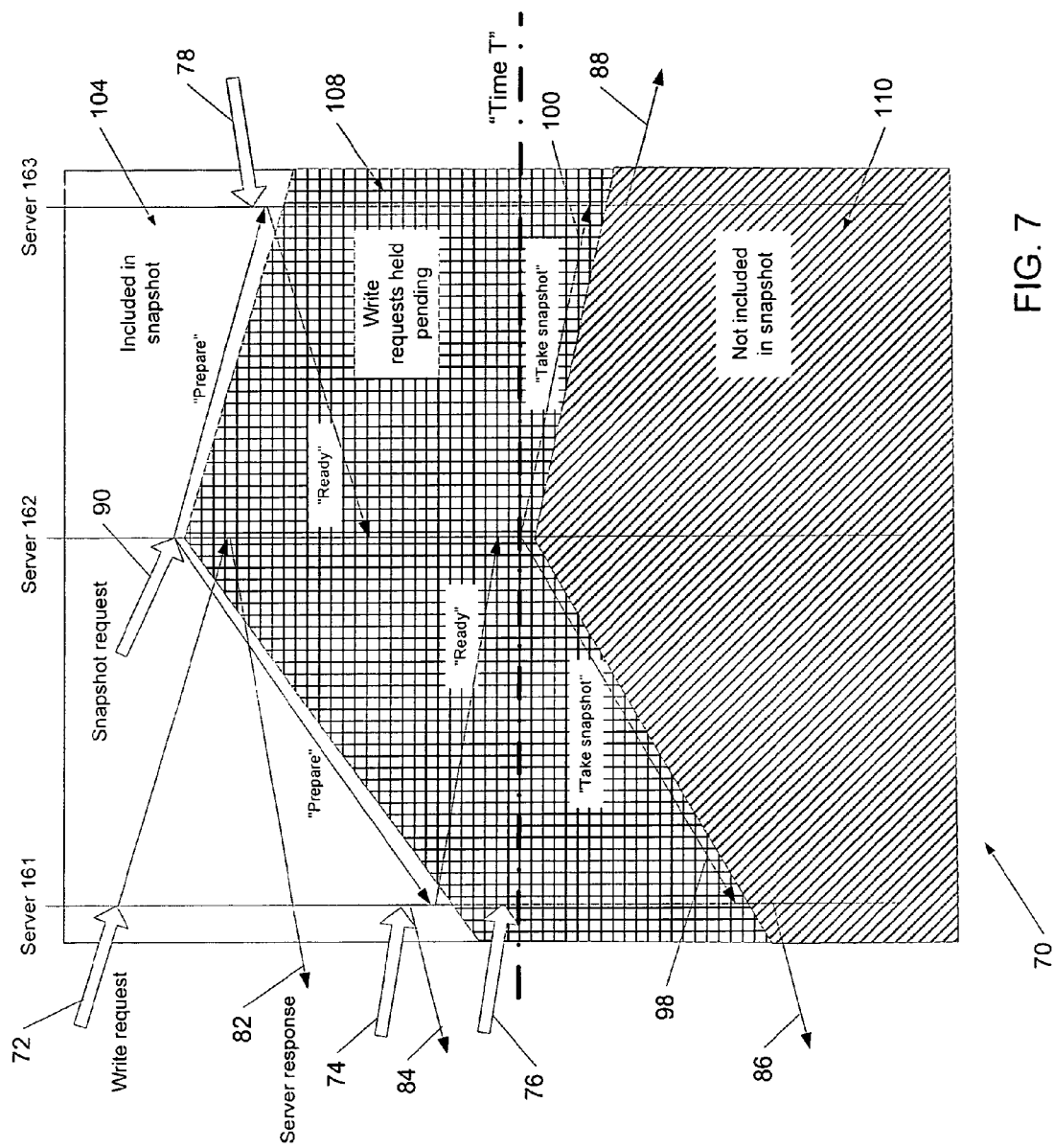
FIG. 7 depicts one process for generating a snapshot of resources supported by the system of the invention.

In one practice, shown in FIG. 7, in response to receiving the command from snapshot process 22B to prepare for creating a snapshot of one or more resources, each of the snapshot processes 22A, 22B and 22C, may suspend all requests that reference any of the resources to which the snapshot command applies. There may be other resources, not mentioned in the snapshot command, and requests for operations on those resources are unaffected. This may include write requests and read requests as well as any other requests appropriate for the application. To this end, each snapshot process 22A, 22B and 22C may include a request control process that allows the snapshot process to process requests being carried out by its respective server and suspend operation of those requests, thereby putting a hold on write operations that may change the state of the requested resource or resources.

Once the respective snapshot processes 22A, 22B, 22C have suspended processing of requests, a reply to the coordinating snapshot process 22B may be generated, indicating that the server is ready to begin taking a snapshot of the requested resource, such as resource 18. Once the coordinating snapshot process 22B has received a ready signal from each of the server 22A and has determined that it is also ready for a snapshot operation, the coordinating snapshot process 22B may issue a snapshot command to the appropriate server(s). In response to receiving the snapshot commands, the server may activate, optionally, an archive process that generates state information that is representative of a copy of the data blocks of volume 18 maintained by that respective server In one practice, a mirror image is created through a "copy on write" process such that the portions (pages) of the volume which have not changed since the creation of the snapshot are recorded once. That mirror image may be transferred to tape or another archival storage medium at a later time if desired. Such techniques are known in the art, and the technique employed may vary according to the application and as appropriate given the volume of the mirror image and other similar criteria.

Once the state information has been created, the snapshot process is terminated and the servers may release any suspended or pending requests for processing.

FIG. 7 depicts one process according to the invention for generating a snapshot image of two resources that have been partitioned across the servers 161, 162 and 163. As described more fully herein the distributed snapshot 70 depicted by FIG. 7 allows a storage administrator to generate information representative of the state of the resources 17 and 18 at a particular point in time. The state information generated may include information such as the file structure, meta-data about the stored data, copies of the data maintained by the partitioned resources or copies of portions of the resources, or other such infonllation. Accordingly, it will be understood that the snapshot process described herein has many applications including applications wherein information is generated about the structure of the partitioned resources and stored for later use as well as applications wherein complete archived copies of the partitioned resources are created.

The distributed snapshot process described herein may be employed in other applications and such other applications shall be understood to fall within the scope of the invention.

FIG. 7 depicts a time/space diagram that shows a sequence of operations that implement a snapshot request for the purpose of generating state information of a partitioned resource or resources. In particular, FIG. 7 depicts a multistage process 70 that creates a consistent distributed snapshot of the resources 17 and 18. To this end, FIG. 7 depicts three vertical lines to represent the three servers, 162, 162 and 163 shown in FIG. 5. Arrows 72 through 78 depict write requests issued from one or more clients 12, and arrows 82 through 88 represent responses from respective ones of the servers 161, 162 and 163.

As shown in FIG. 7, the process 70 begins when a snapshot command is issued from an administrator. In this case, the snapshot command is issued from the administrator and delivered to server 162. The snapshot command 90 is depicted as arrow 90 directed to server 162. As shown in FIG. 7, the snapshot process executing on server 162 responds to the snapshot command 90 by generating commands for coordinating the operation of the other servers 161 and 163. The commands will coordinate the snapshot processes executed on servers 161 and 163 and generate state information representative of the state of the data maintained by each of the respective servers as part of the resources 17 and 18.

As further shown in FIG. 7, the snapshot process 22B executing on server 162 issues a prepare command 92 and 94 to each of the respective servers 161 and 163. The snapshot processes operating on each of these respective servers 161 and 163 respond to the prepare command by holding pending requests received from clients prior to the arrival of the "prepare" command (e.g., request 78) and requests received subsequent to the "prepare" command (e.g., request 76).

Once requests have been held, the servers 161 and 163 reply to the server 162 that issued the prepare command indicating that the respective servers 161 and 163 have suspended all pending requests. The server 162 acting as the coordinating server then issues the snapshot command to each of the servers. This is shown in FIG. 7 by the arrows 98 and 100.

In response to the snapshot command, servers 161 and 163, as well as server 162, create a snapshot of the portion of the requested resources maintained by that respective server. The snapshot information may then be stored in a data file on each of the respective servers. In an optional practice, the snapshot processes 22A, 22B, 22C executing on each of the servers 161, 162, and 163, may generate archive copies of the resources. The archive copies may be transferred to a tape storage device, or some other type of mass storage device.

The snapshot generated will contain all of the request completed in the region 104 and none of those completed in region 110.

Figure 8:
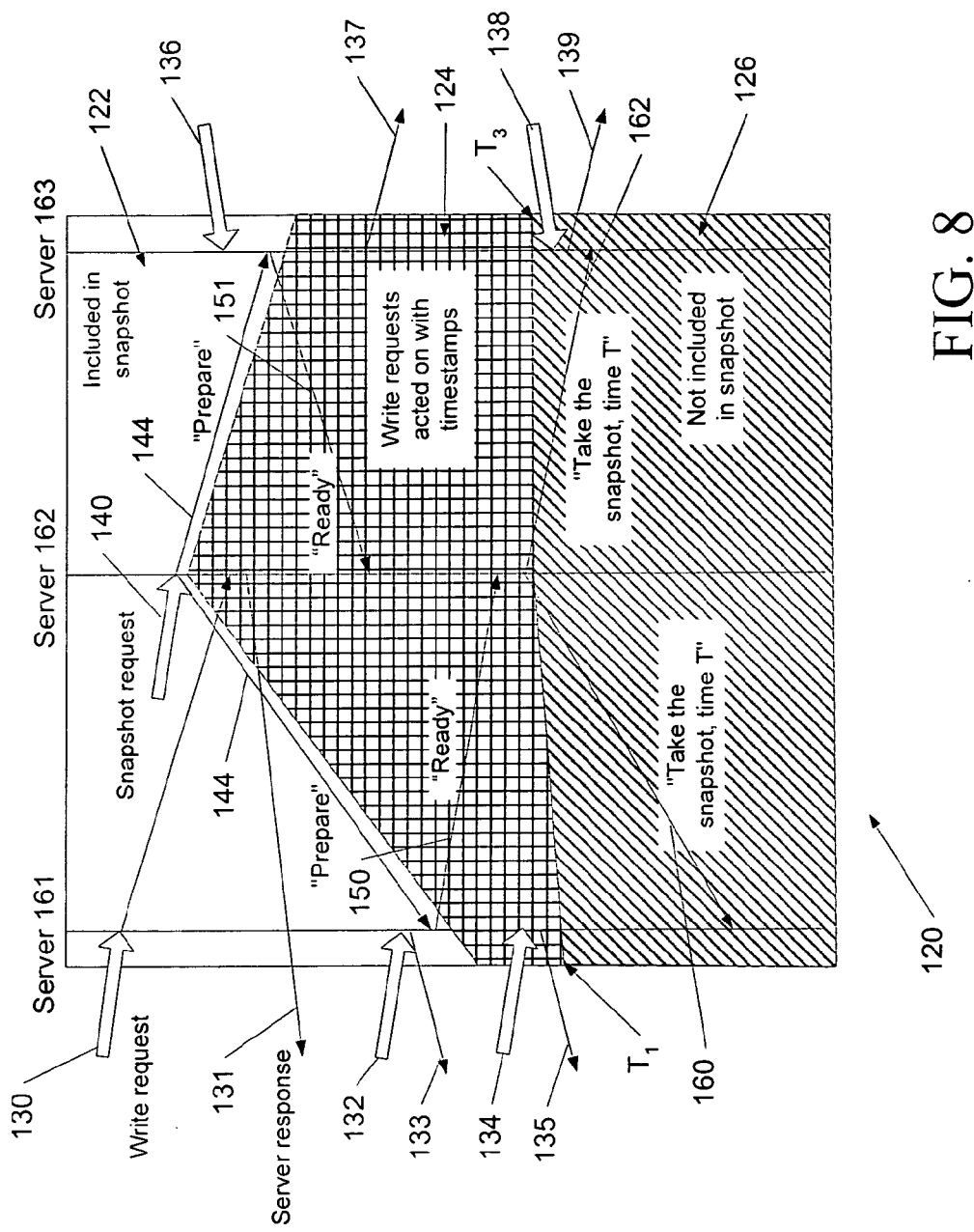
FIG. 8 depicts an alternate process for generating a snapshot of resources supported by the system of the invention.

FIG. 8 depicts an alternative embodiment of a process for generating a snapshot of a partitioned resources. Specifically, FIG. 8 depicts a space-time diagram that shows a process 120 as it occurs over three time periods. These time periods are depicted in FIG. 8 as different shaded regions within the space-time diagram and are labeled as time periods 122, 124 and 126. Time period 122 occurs before the time at which an administrator issues a snapshot request 140, time period 124 occurs between the time period that the snapshot request 140 is issued and the snapshot operation begins, and time period 126 occurs after the snapshot has been created. The request for a snapshot operation 140 is shown by the arrow 140 and different write requests are illustrated by the arrows 130 through 138. Responses to the write requests are illustrated by arrows 131, 133, 135, 137 and 139. As in FIG. 7, the three servers of the system 10 depicted FIG. 5 as shown by the vertical lines which are labeled server 161, 162 and 163 respectively.

The process 120 depicted by FIG. 8 illustrates the creation of a consistent distributed snapshot through the use of time stamps and synchronized system clocks. More particularly, the process 120 illustrates that the servers 161, 162 and 163 can receive a plurality of write requests, each of which can arrive at anyone of the respective servers at any particular time. This is shown in FIG. 8 by the write requests 130, 132 and 136 which occur during the time period 122. As further shown in FIG. 8 write request 134 may arrive during the time period 124 and write request 138 may arrive during the time period 126. Accordingly, the process 120 depicted in FIG. 8 is designed to handle write requests that can occur before, during and after the snapshot process.

The snapshot process begins when a snapshot request 140 is received by at least one of the servers 161, 162 and 163. FIG. 8 depicts snapshot request 140 being sent from an administrator to the server 162. Upon receipt of the snapshot request 140, the snapshot process operating on the server 162 may issue "prepare" commands 142, 144 to the other servers 161, 163 that are supporting the resource(s) for which the snapshot is being created. The prepare command is depicted by arrow 142 which is sent from server 162 to the server 161, and by arrow 144 which is sent from server 162 to the server 163. Upon receipt of the prepare command, one or both of the servers 161 and 163 as well as server 162, prepare for a snapshot. It will be understood that if a snapshot of, for example, only resource 18 is requested, the prepare command will only be sent to server 161 which holds data of the partitioned resource 18.

Requests that are still pending at the servers are allowed to proceed and can be acknowledged as soon as they finish, as it is not necessary to hold them pending. Instead the respective servers 161, 162 and 163 determine the time at which each such request was processed and time stamps each of the respective requests. In the example depicted by FIG. 8, this time stamping is done to write requests 136, 134 and 138, all of which are pending or received after the snapshot request 140 has been received by server 162. Once the coordinating server 162 receives a "ready" response 150, 151 from the respective servers 161 and/or 163, the coordinating server 162 generates a command to take a snapshot and transmits this command to the waiting servers 161 and/or 163. This command includes a time-stamp, which is the current time. This is illustrated in FIG. 8 by the arrows 160 and 162 that represent commands to the servers 161 and 163. When servers 161 and 163 receive this command, the servers include write requests with time stamps earlier than the time transmitted with the commands 161 and 162 in the snapshot. Write requests with time stamps later than the time stamp of the "Take Snapshot" commands 160 and 162 are not included in the generated snapshot. In the example depicted in FIG. 8 the write requests 136 and 134 are included within the generated snapshot while the write request 138 is not included within the generated snapshot. Once the snapshot information is generated, the process 120 may proceed as the process 70 described above with reference to FIG. 7. The times TI and T3 indicate the "Time T" as seen by the servers 161 (Server 1) and server 163 (Server 3), respectively.

Those skilled in the art will understand that the diagrams of FIGS. 7 and 8 are drawn for the situation where three servers 161, 162 and 163 participate in the snapshot process. If a snapshot of only resource 18 is requested, server 163 would not participate in the snapshot process. Likewise, server 161 would not participate in a snapshot process for only resource 17. Additional servers and snapshot commands would have to be included for partitioned resources distribute over more than three servers.

Although FIG. 1 depicts the system as an assembly of functional block elements including a group of server systems, it will be apparent to one of ordinary skill in the art that the systems of the invention may be realized as computer programs or portions of computer programs that are capable of running on the servers to thereby configure the servers as systems according to the invention. Moreover, although FIG. 1 depicts the group 16 as a local collection of servers, it will be apparent to those or ordinary skill in the art that this is only one embodiment, and that the invention may comprise a collection or group of servers that includes server that are physically remote from each other.

As discussed above, in certain embodiments, the systems of the invention may be realized as software components operating on a conventional data processing system such as a Unix workstation. In such embodiments, the system can be implemented as a C language computer program, or a computer program written in any high level language including C++, Fortran, Java or basic. General techniques for such high level programming are known, and set forth in, for example, Stephen G. Kochan, Programming in C, Hayden Publishing (1983).

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A first storage server comprising:
a resource storage device, for storing a first subset of a partitioned resource;
a first connection, for accessing a second subset of the partitioned resource stored on a second storage server, and for exchanging information with the second storage server so that the first and second storage servers operate as a storage area network;
a second connection, for providing access to the partitioned resource as a whole by one or more network clients;
a routing table storage device, for maintaining a routing table indicating which of the first or second servers is responsible for which subset of the partitioned resource; and
a processor, for executing a snapshot process, the snapshot process determining data indicative of a state of at least the first subset of the partitioned resource, and for receiving data over the first connection from the second storage server indicative of a state of at least the second subset of the partitioned resource, and the snapshot process also generating snapshot state information representative of the partitioned resource as a whole, the snapshot state information being representative of a state of partitioned data as maintained by the first and second storage servers, and including at least information concerning a file structure of such partitioned data.

2. The apparatus of claim 1 wherein the processor further sends a time stamped command to the second storage server to coordinate the snapshot state information.

3. The apparatus of claim 2 wherein the snapshot process further receives requests for snapshot state information from the second storage server.

4. The apparatus of claim 3 wherein the processor further executes a request control process that includes a suspend process for suspending processing of requests from the second storage server.

5. The apparatus of claim 4 wherein the request control process includes a time-stamp process for time stamping requests received from the second server.

6. The apparatus of claim 3 wherein the snapshot process further analyzes suspended requests to determine requests received from the second server after a selected time.

7. The apparatus of claim 1 further including an archive process for using the snapshot state information to create a copy of the partitioned resource.

8. The apparatus of claim 1 further including an archive process for using the state information to simultaneously create copies of a plurality of resources partitioned across the first and second storage servers.

9. A process for providing a storage area network comprising the steps of:
storing a first subset of a partitioned resource on a first server;
accessing a second subset of the partitioned resource via a network connection to a second server;
allowing access to the partitioned resource as a whole by network clients only from the first server, with the network clients accessing the partitioned resource as a whole and not being given access to state information concerning partitioning of the resource among the first and second storage servers;
maintaining a routing table on the first server, the routing table indicating which of the first or second storage server is responsible for which subset of the partitioned resource; and
operating a snapshot process on the first server, with the snapshot process holding data of at least the first subset of the partitioned resources, and the snapshot process receiving information from at least a second snapshot process operating on the second server holding data of the second subset of the partitioned resources, and for generating a snapshot of those portions of the partitioned resources maintained by each respective server, and for generating snapshot state information representative of a state of partitioned data maintained by each respective server, the snapshot state information including at least a file structure of such data.

10. The process according to claim 9, wherein coordinating snapshot processes includes coordinating snapshot processes operating on one of the servers with snapshot processes operating on all other servers that hold data of the subsets of the partitioned resources residing on the one server.

11. The process according to claim 10, wherein coordinating snapshot processes between servers includes time-stamping a command that coordinates the at least one other snapshot process.

12. The process according to claim 9, wherein operating a snapshot process includes operating a request control process for processing requests received by the respective server.

13. The process according to claim 12, wherein the request control process includes a suspend process for suspending processing of requests by the respective server.

14. The process according to claim 12, wherein the request control process includes time stamping requests received by the respective server.

15. The process according to claim 12, further including analyzing suspended requests to determine requests received after a selected time.

* * * * *